US009817787B2

(12) United States Patent
Nair et al.

(10) Patent No.: US 9,817,787 B2
(45) Date of Patent: Nov. 14, 2017

(54) METHOD, APPARATUS AND SYSTEM FOR ENCAPSULATING INFORMATION IN A COMMUNICATION

(71) Applicant: Intel Corporation, Santa Clara, CA (US)

(72) Inventors: Mohan K. Nair, Portland, OR (US); Brent D. Thomas, Chandler, AZ (US); Ramamurthy Krithivas, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 273 days.

(21) Appl. No.: 14/669,295

(22) Filed: Mar. 26, 2015

(65) Prior Publication Data
US 2016/0283433 A1    Sep. 29, 2016

(51) Int. Cl.
*G06F 13/14*    (2006.01)
*G06F 13/36*    (2006.01)
(Continued)

(52) U.S. Cl.
CPC ........ *G06F 13/4282* (2013.01); *G06F 9/4411* (2013.01); *G06F 13/4022* (2013.01); *G06F 13/4068* (2013.01)

(58) Field of Classification Search
None
See application file for complete search history.

(56) References Cited

U.S. PATENT DOCUMENTS 5,586,271 A * 12/1996 Parrett ................ G06F 13/4068
                                                        326/86
7,096,308 B2 * 8/2006 Main ................... G06F 13/4027
                                                        710/306
(Continued)

FOREIGN PATENT DOCUMENTS

WO    2014004021    1/2014

OTHER PUBLICATIONS

U.S. Appl. No. 14/531,008, filed Nov. 3, 2014, entitled "A Method, Apparatus and System for Automatically Discovering Nodes and Resources in a Multi-Node System," by Mohan K. Nair.
(Continued)

*Primary Examiner* — David E Martinez
(74) *Attorney, Agent, or Firm* — Trop, Pruner & Hu, P.C.

(57) ABSTRACT

In one embodiment, a node includes at least one core to independently execute instructions; a first host device to receive information from the at least one core and to include the information in a first packet of a first communication protocol; a selection logic coupled to the first host device to receive the first packet and to provide the first packet to a conversion logic or a first interface to communicate with a first device via a first interconnect of the first communication protocol; the conversion logic to receive the first packet under selection of the selection logic and to encapsulate the first packet into a second packet of a second communication protocol; and a second interface coupled to the conversion logic to receive the second packet and to communicate the second packet to a second device via a second interconnect of the second communication protocol. Other embodiments are described and claimed.

19 Claims, 8 Drawing Sheets

(51) Int. Cl.
*H05K 7/10* (2006.01)
*G06F 13/42* (2006.01)
*G06F 9/44* (2006.01)
*G06F 13/40* (2006.01)

(56) References Cited

U.S. PATENT DOCUMENTS

| | | |
|---|---|---|
| 2005/0235135 A1 | 10/2005 | Dao et al. |
| 2005/0262269 A1 | 11/2005 | Pike |
| 2007/0106873 A1* | 5/2007 | Lally .................. G06F 12/0292 |
| | | 711/202 |
| 2008/0195747 A1 | 8/2008 | Elmaliah |
| 2012/0120959 A1 | 5/2012 | Krause |
| 2013/0103866 A1* | 4/2013 | Gao ........................ G06F 13/40 |
| | | 710/106 |
| 2013/0191590 A1* | 7/2013 | Malwankar ........... G06F 3/0611 |
| | | 711/114 |
| 2014/0344500 A1 | 11/2014 | Harriman et al. |
| 2015/0074320 A1 | 3/2015 | Galles et al. |
| 2015/0095518 A1* | 4/2015 | Suzuki .................. G06F 13/105 |
| | | 710/2 |
| 2016/0154764 A1* | 6/2016 | He ...................... G06F 13/4282 |
| | | 710/315 |
| 2016/0241491 A1* | 8/2016 | Tripathi .............. H04L 49/1523 |

OTHER PUBLICATIONS

Intel Corporation, "Enhanced Serial Peripheral Interface (eSPI)" Interface Base Specification (for Client and Server Platforms), Revision 0.75, Jun. 2013, pp. 1-133.

U.S. Appl. No. 14/317,308, filed Jun. 27, 2014, entitled "Reducing Latency of Unified Memory Transactions," by Mohan K. Nair.

International Searching Authority, "Notification of Transmittal of the International Search Report and the Written Opinion of the International Searching Authority," dated Jun. 8, 2016 in International application No. PCT/US2016/019670.

Taiwan Intellectual Property Office, Office Action dated May 19, 2017 in Taiwanese Patent Application No. 105105323 (translation redacted).

\* cited by examiner

US 9,817,787 B2

METHOD, APPARATUS AND SYSTEM FOR ENCAPSULATING INFORMATION IN A COMMUNICATION

TECHNICAL FIELD

Embodiments relate to communications within a computing system.

BACKGROUND

As time progresses, integrated circuits such as systems on chip (SoC) are created that include higher amounts of integration. Higher levels of integration can increase the amount of external components with which the integrated circuits are to interact.

A conventional single-node computing system such as a client computer system or standalone server computer system is typically formed of various integrated circuits and other components and generally has dedicated resources. As systems move from a single node design to multi-node topologies such as in the server space, it can become very costly to provide dedicated resources to each node. Thus in certain multi-node/multi-host/multi-cluster systems (generally referred to as multi-node systems), some amount of platform resource sharing occurs to reduce total cost and further to reduce power consumption. However, solutions for resource sharing often lead to design tradeoffs and/or restrictions in defining different multi-node topologies, including due to electrical and routing issues.

DETAILED DESCRIPTION

In various embodiments, a technique is provided to enable information packets of one communication protocol to be tunneled, encapsulated, or otherwise communicated within information packets of another communication protocol. For purposes of discussion herein, packets compliant with an Enhanced Serial Peripheral Interface (eSPI) protocol such as described in the Enhanced Serial Peripheral Interface (eSPI) Base Specification (June 2013, Rev. 0.74) may be tunneled within packets compliant with a Peripheral Component Interconnect Express (PCIe) protocol such as described in the PCIe Base Specification revision 3.0 (dated Nov. 10, 2010). Embodiments of course may be applied to other communication protocols.

Embodiments that operate to tunnel eSPI cycles across a PCIe interface facilitate multi-node sharing of eSPI resources coupled to a central component (also referred to herein as a central controller) and/or a particular configured node (e.g., a given SoC) of a multi-node system. In this way, one or more eSPI devices may be shared, while eliminating the dependency and limitations of communication via an eSPI interface. As such, flexible multi-node topologies may be designed with higher resource sharing radius and lower latencies.

Figure 1:
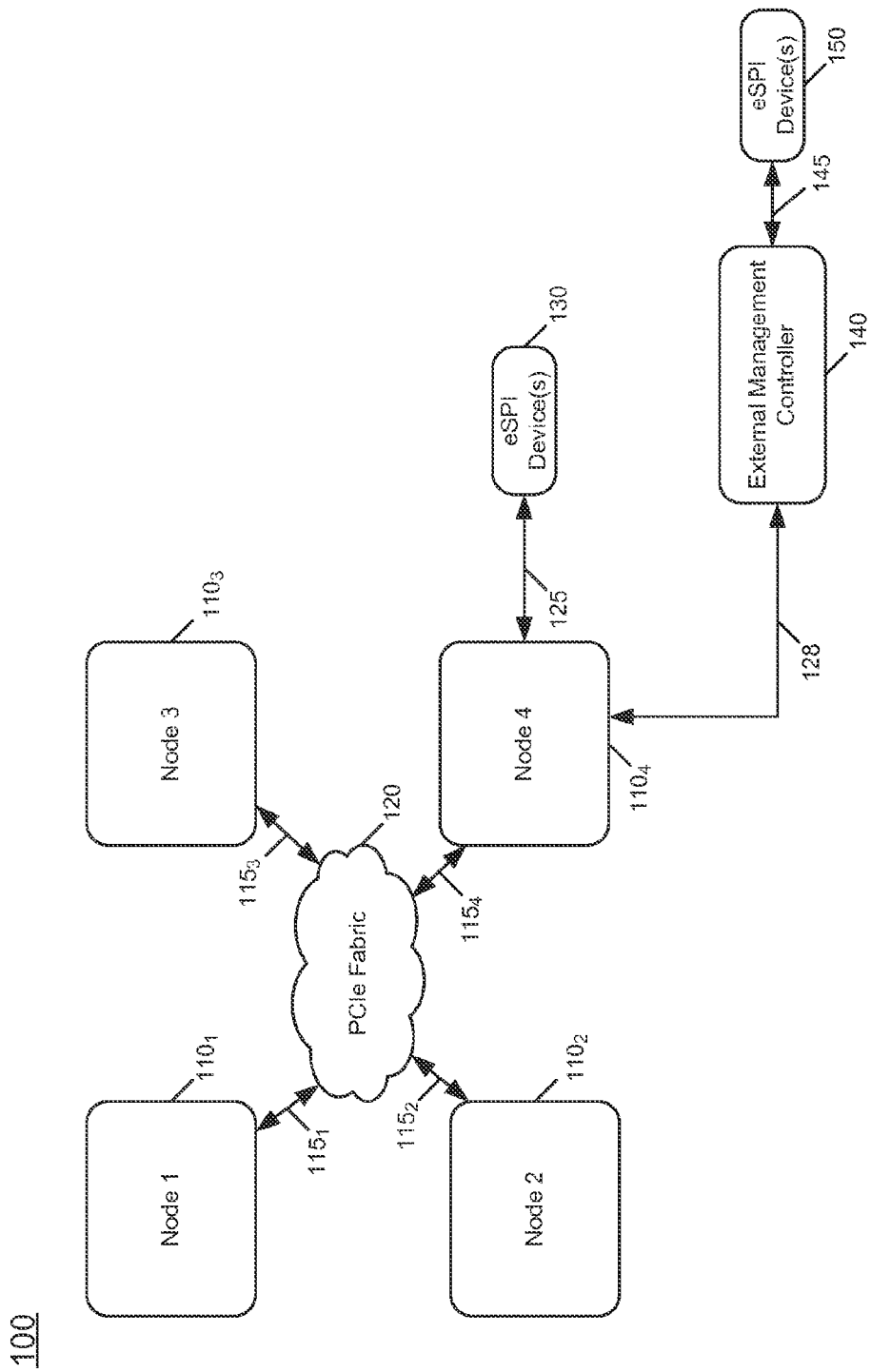
FIG. 1 is a block diagram of a system in accordance with an embodiment of the present invention.

Referring now to FIG. 1, shown is a block diagram of a system in accordance with an embodiment of the present invention. As shown in FIG. 1, system 100 is a multi-node system including a plurality of nodes $110_1$-$110_4$. Understand that nodes 110 may be differently implemented in various embodiments. In some cases, nodes 110 each may be a central processing unit (CPU) such as a given multicore processor of a multi-node system 100, which may be a given server computer, e.g., blade, micro-server or so forth. In other cases, each node 110 itself may be a complete computing system (e.g., including processing resources, I/O resources, memory resources and networking resources).

In various embodiments, nodes 110 each may include at least one dedicated eSPI interface (including one or more ports) for connecting to external devices such as an external flash memory or a trusted platform module (TPM) via an interconnect compliant with an eSPI specification (hereafter eSPI interconnect). Nodes 110 each also may include one or more PCIe interfaces (including one or more ports) for connecting to external devices via an interconnect compliant with a PCIe specification (hereafter PCIe interconnect). Embodiments may use one or more PCIe interfaces of a node to tunnel eSPI cycles to facilitate the multi-node sharing of eSPI resources.

In any case, as further shown in FIG. 1 nodes 110 couple to a fabric 120, which in an embodiment is a PCIe fabric. More specifically, each node 110 couples to fabric 120 via a corresponding interconnect $115_1$-$115_4$ (each of which may be a PCIe interconnect). As such, each node 110 may include at least one interface having a port to enable PCIe-based communications. As will be described more specifically herein, in embodiments this port may, in addition to PCIe communication, also provide for communication of eSPI information via tunneling of eSPI packets in one or more PCIe packets as described herein.

Still with reference to FIG. 1, node $110_4$ is coupled via an interconnect 125 to one or more peripheral devices 130. In various embodiments, peripheral devices 130 may provide for communication in accordance with an eSPI specification. As such, interconnect 125 may be an eSPI interconnect. Note that various types of peripheral devices such as flash memories, trusted platform modules, and baseboard management controllers (BMCs) may be implemented as eSPI devices. Furthermore, such devices may be shared between the multiple nodes, reducing overall system costs and complexity by allowing each of nodes 110 to share the functionality available within such devices.

In this arrangement, node $110_4$ acts as a master node for interfacing with device(s) 130. In this way, eSPI interfaces within the other nodes $110_1$-$110_3$ may be unconnected (and configured to be disabled and/or in a powered down state) as any eSPI-based communications instead route via a given PCIe interface and corresponding interconnect 115 through fabric 120 to node $110_4$.

In some cases, an external management controller 140 may couple to one or more additional eSPI devices 150 (via a corresponding eSPI interconnect 145). In such cases, external management controller 140 in turn may communicate with node 110₄ via another eSPI interconnect 128. Understand while shown at this high level in the embodiment of FIG. 1, many variations and alternatives are possible. For example, while shown with four nodes in FIG. 1, understand that the number of nodes supported in a system topology is not limited in this regard.

Figure 2:
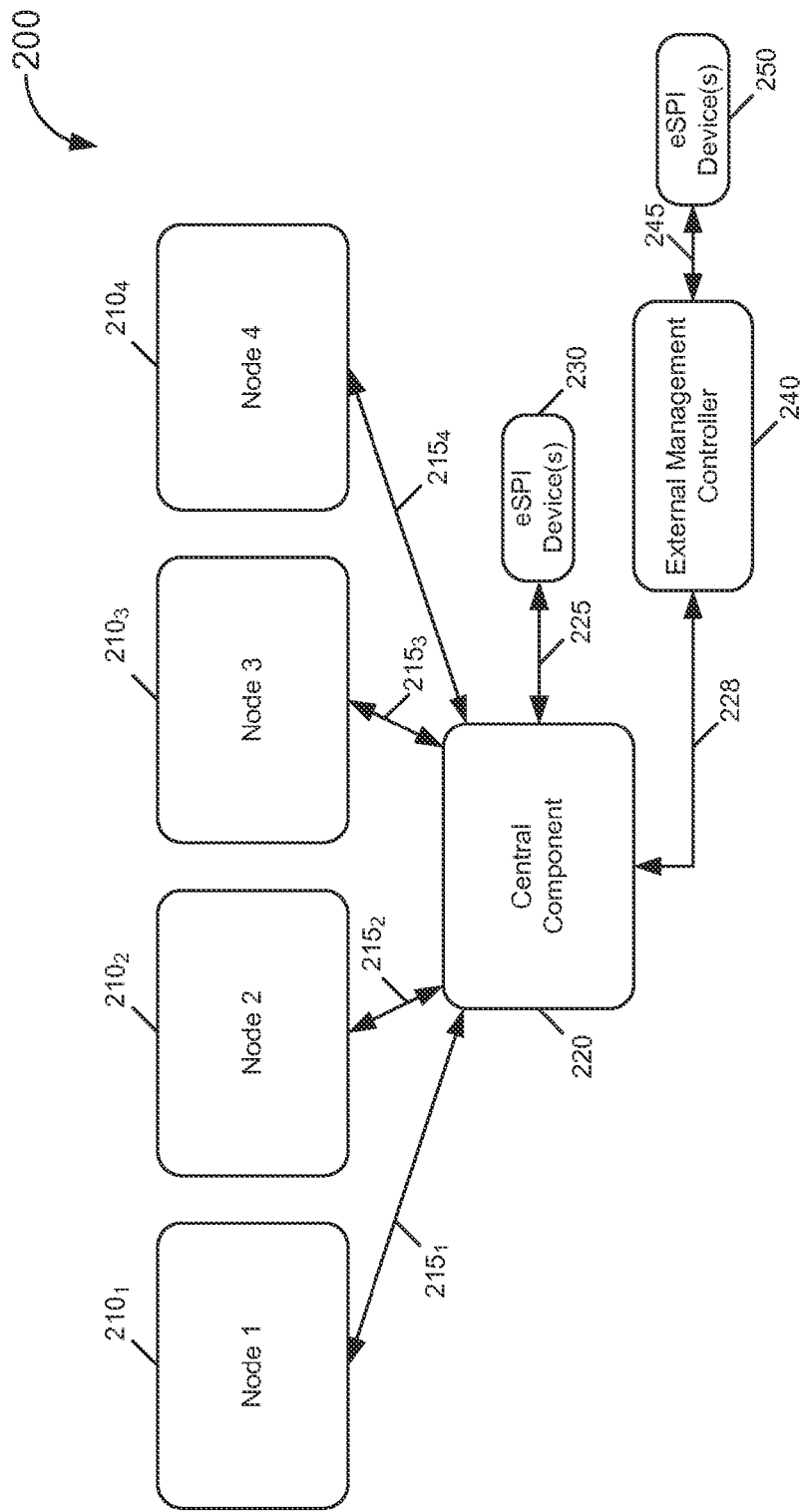
FIG. 2 is a block diagram of a system in accordance with another embodiment of the present invention.

Referring now to FIG. 2, shown is a block diagram of a system 200 in accordance with another embodiment of the present invention. As shown in FIG. 2, a central component 220 is configured to be a master interface to one or more eSPI devices 230. Thus nodes 210₁-210₄, which may be any type of node as discussed above, couple to central component 220 via corresponding interconnects 215₁-215₄ (which in an example may be PCIe interconnects). In this case, nodes 210 may have their internal eSPI interfaces disabled and/or otherwise placed in a low power state, as eSPI-based communications instead are tunneled via an internal PCIe interface and along corresponding PCIe interconnect 215 to central component 220 for interaction with corresponding eSPI devices 230.

As further illustrated in FIG. 2, an external management controller 240 may couple to one or more additional eSPI devices 250 (via a corresponding eSPI interconnect 245). In such cases, external management controller 240 in turn may communicate with central component 220 via another eSPI interconnect 228. Note that eSPI device types and connectivity topology to central component 220 may be dictated by the eSPI specification and system requirements. In some cases, central component 220 may provide other resource sharing functionalities.

Thus SoCs, other nodes, and central components may be configured to route encapsulated or de-capsulated eSPI packets to a designated PCIe interface or a eSPI interface based on the topology of the system configuration. In addition, such circuits include an eSPI-Express interface to encapsulate and de-capsulate eSPI packets to and from PCIe packets.

Figure 3:
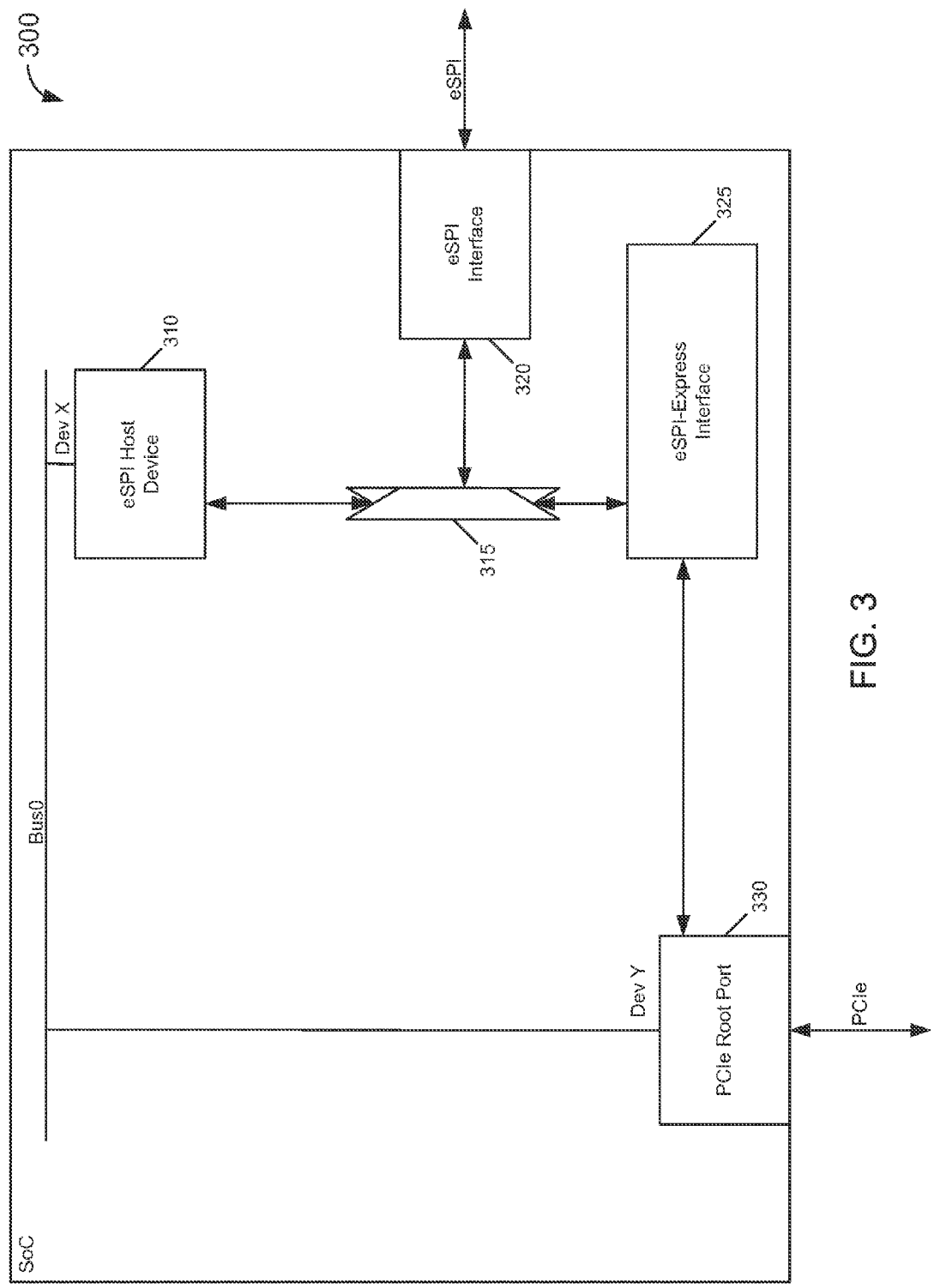
FIG. 3 is a block diagram of a portion of a node in accordance with an embodiment of the present invention.

Referring now to FIG. 3, shown is a block diagram of a portion of a node in accordance with an embodiment of the present invention. As shown in FIG. 3, node 300 is a portion of a SoC. Included in SoC 300 is an eSPI host device 310, which may be coupled to an enumerated bus 0 as a given device (device X in FIG. 3). Host device 310 couples to a multiplexer 315 or another selection logic that in turn is controlled to selectively provide communications out of node 300 either via an eSPI interface 320 or a given PCIe interface, namely a designated PCIe root port 330. Designated root port 330 may provide eSPI tunneling in addition to other functionality for which it is designed. As such, root port 330 may be configured to allow tunneling of eSPI packets.

Multiplexer 315 of SoC 300 thus allows eSPI access to an eSPI interconnect or a PCIe interconnect, depending on a particular system configuration (or controllable dynamically based on source/destination of particular traffic). To this end, multiplexer 315 further couples to an eSPI-Express interface 325 coupled between multiplexer 315 and root port 330. In various embodiments, eSPI-Express interface 325 is configured to perform tunneling of eSPI information into a PCIe-based format to enable its communication via root port 330, which in turn is coupled to a PCIe interconnect (which in the embodiment shown is an off-node link) As such, interface 325 is configured to generate and deconstruct packets formatted to encapsulate eSPI packets within PCIe packets.

Assume instead that node 300 is configured to be directly coupled to an external eSPI device via eSPI interface 320, which in turn is coupled to an eSPI interconnect (which in the embodiment shown is an off-node link) In this instance, multiplexer 315 is controlled to provide communications between host device 310 and eSPI interface 320. In such configuring of node 300, eSPI-Express interface 325 may be controlled to be disabled or otherwise powered off to reduce power consumption when this interface is unused.

Still further, incoming communications are received in root port 330. Root port 330 may be configured to determine based on encoding present in a given packet whether the packet includes tunneled eSPI information. If so, the packet may be communicated to eSPI-Express interface 325 which may parse the eSPI information and provide it via multiplexer 315 to host device 310 or to eSPI interface 320. Thus via the arrangement in FIG. 3, eSPI information can be communicated to a locally attached eSPI device, to be shared with remote nodes and/or a central component. If the eSPI device is connected locally with respect to SoC 300, then the local accesses are passed directly to a connected eSPI interconnect without any format change. All remote accesses to such locally connected eSPI device are via eSPI-Express interface 325 to de-capsulate PCIe packets into eSPI packets to be communicated to the local eSPI device. If the eSPI device is connected remotely to SoC 300, then local accesses are encapsulated by eSPI-Express interface 325 and passed through root port 330 to the node or central component that supports the eSPI device(s) locally. Understand while shown at this high level in the embodiment of FIG. 3, many variations and alternatives are possible.

Figure 4:
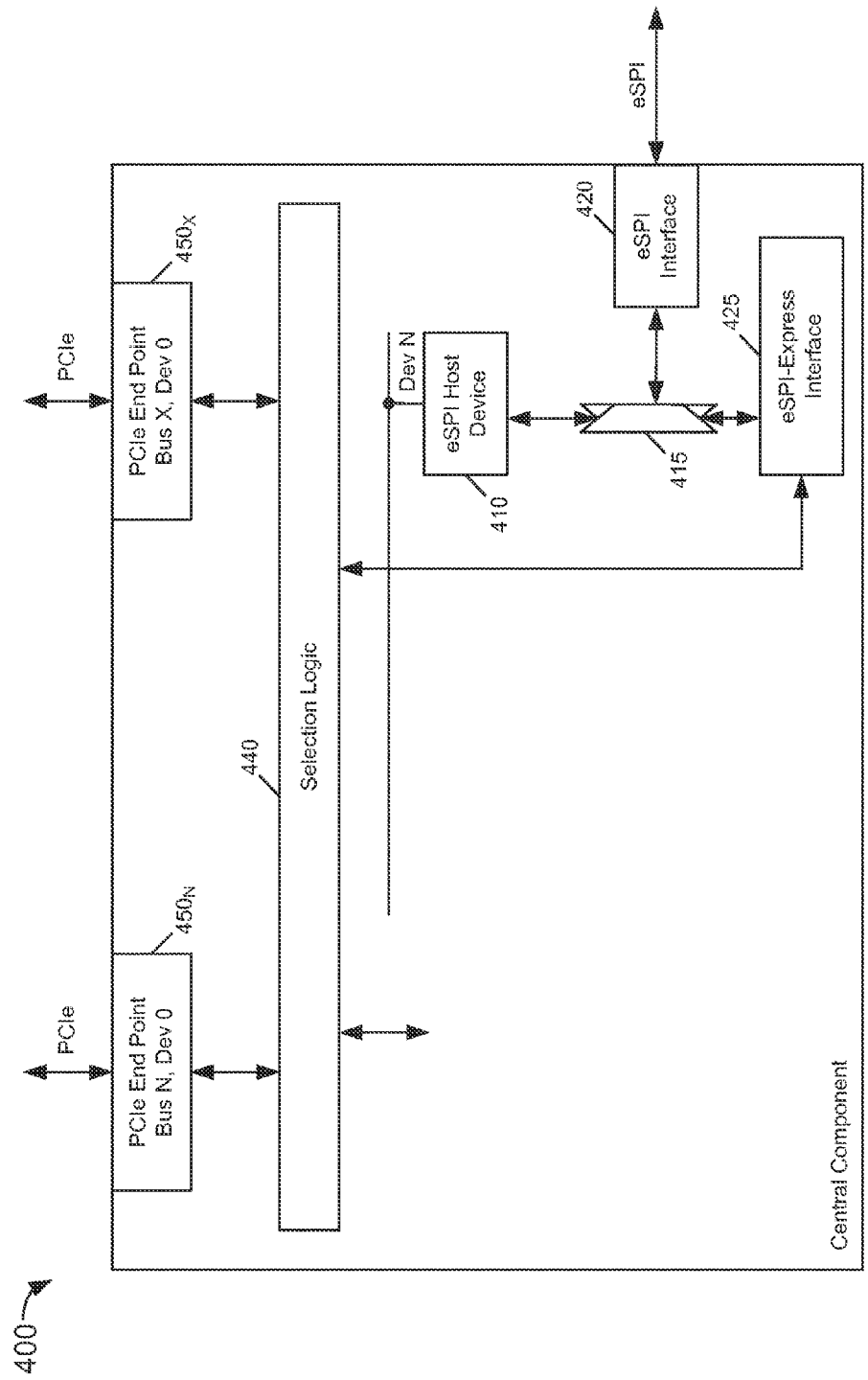
FIG. 4 is a block diagram of a portion of a central component in accordance with an embodiment of the present invention.

Referring now to FIG. 4, shown is a block diagram of a portion of a central component in accordance with an embodiment of the present invention. Although the scope of the present invention is not limited in this regard, example central components include a server peripheral controller hub (sPCH), baseboard management controller or so forth. As shown in FIG. 4, central component 400 includes an eSPI host device 410, which may be coupled to an enumerated bus as a given device (device N in FIG. 4). Host device 410 couples to a multiplexer 415 (or other selection logic) that in turn is controlled to selectively output information off-chip either via an eSPI interface 420 or one of a plurality of PCIe end points 450ₙ-450ₓ. That is, a designated end point 450 may provide eSPI tunneling in addition to other functionality for which it is designed.

Multiplexer 415 of central component 400 thus allows eSPI access to an eSPI interconnect or a PCIe interconnect, depending on a particular system configuration (or controllable dynamically based on source/destination of particular traffic). To this end, multiplexer 415 further couples to an eSPI-Express interface 425. In various embodiments, eSPI-Express interface 425 is configured to perform tunneling of eSPI information into a PCIe-based format to enable its communication via a given PCIe end point 450. As such, interface 425 is configured to generate and deconstruct packets formatted to encapsulate eSPI packets within PCIe packets.

Assume instead that central component 400 is configured to be directly coupled to an external eSPI device via eSPI interface 420, which in turn is coupled to an eSPI interconnect (which in the embodiment shown is an off-node link) In this instance, multiplexer 415 is controlled to provide communications between host device 410 and eSPI interface 420.

If the eSPI device is connected locally with respect to central component 400, then the local accesses are passed directly to a connected eSPI interconnect without any format change. All remote accesses to such locally connected eSPI device are via eSPI-Express interface 425 to de-capsulate PCIe packets into eSPI packets to be communicated to the local eSPI device.

Figure 5:
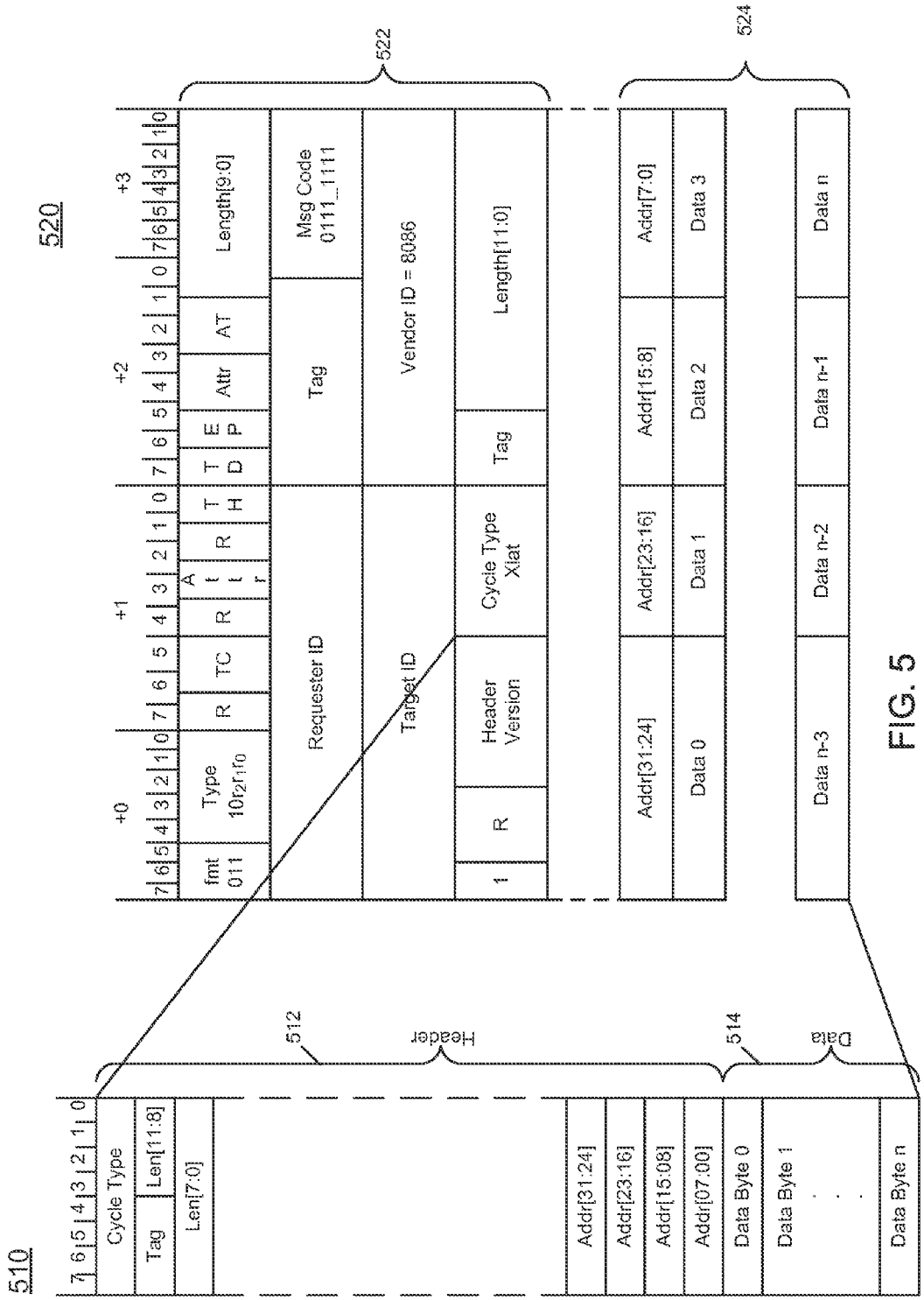
FIG. 5 is an illustration of an eSPI packet and its encapsulation into a PCIe packet in accordance with an embodiment.

Referring now to FIG. 5, shown is an illustration of an eSPI packet 510 and its encapsulation into a PCIe packet 520 in accordance with an embodiment. As shown in FIG. 5, eSPI packet 510 includes a header portion 512 including a variety of different information, and a data portion 514 that includes a plurality of data bytes. In turn, PCIe packet 520, which is a PCIe Type 1 Message with data packet, includes a header portion 522 and a data portion 524. In general, part of header portion 512 of eSPI packet 510 may be incorporated within header portion 522 of PCIe packet 520. The address portion of header portion 512 and data portion 514 may be incorporated into data portion 524 of PCIe packet 520. In some embodiments, all eSPI packet formats defined in the eSPI specification except short packet formats may be enabled to be tunneled as described herein. In an embodiment, such eSPI packets are encapsulated through PCIe Type 1 Message with Data formats.

As illustrated in FIG. 5, Byte0, Bit7 of a fourth doubleword (Dword) of PCIe packet header 522 is set to "1" to act as a tunnel indicator. The "Cycle Type" field of header 512 of eSPI packet 510 may be translated for incorporation into a "Cycle Type Xlat" field of header 522 of PCIe packet 520. In turn, tag and length fields of header 512 may be incorporated into corresponding fields of header 522. The eSPI specification defines a plurality of channels for an eSPI interconnect, namely Flash, Peripheral, Out of Band Message, and Virtual Wire, all of which can be supported via the PCIe encapsulation as described herein.

Note that PCIe interfaces in a node typically receive programming (e.g., by Basic Input Output System (BIOS)) after reset to configure the ports with proper widths and speeds, to enable a link to train and function properly. Using an embodiment, although a flash device containing the BIOS code is placed behind a PCIe interface, an initial configuration may be effected to enable functional operation before this link training occurs. A component reset sequence may enable a designated PCIe interface (e.g., root port 330 of FIG. 3 and/or PCIe end points 450 of FIG. 4) to exit a reset state early in a reset sequence. This designated PCIe interface then may be designated with a default configuration (e.g., a single port, link width) based on its connected device. As one example, this link may be configured at x4 or x4 width at PCIe Gen1 speed 4 (which is at a link width of 4 or 1 and an operating frequency of 2.5 GHz). After initial operations at this base link width and speed, BIOS or other boot code (e.g., stored in an eSPI device) may operate to re-initialize the designated PCIe interface to a higher level of functionality.

Using a power management handshake technique, any device seeking access to an eSPI device can wake the designated PCIe interface of its own device to enable the access. In addition, embodiments may handle error situations in an eSPI device by encapsulating such errors into a PCIe packet. In turn, registers or other storages may be defined to log tunneled eSPI packet errors. Selected errors can be mapped to equivalent eSPI errors. As an example, a PCIe link failure error may be aliased to an eSPI link error (which is a master abort equivalent).

Figure 6:
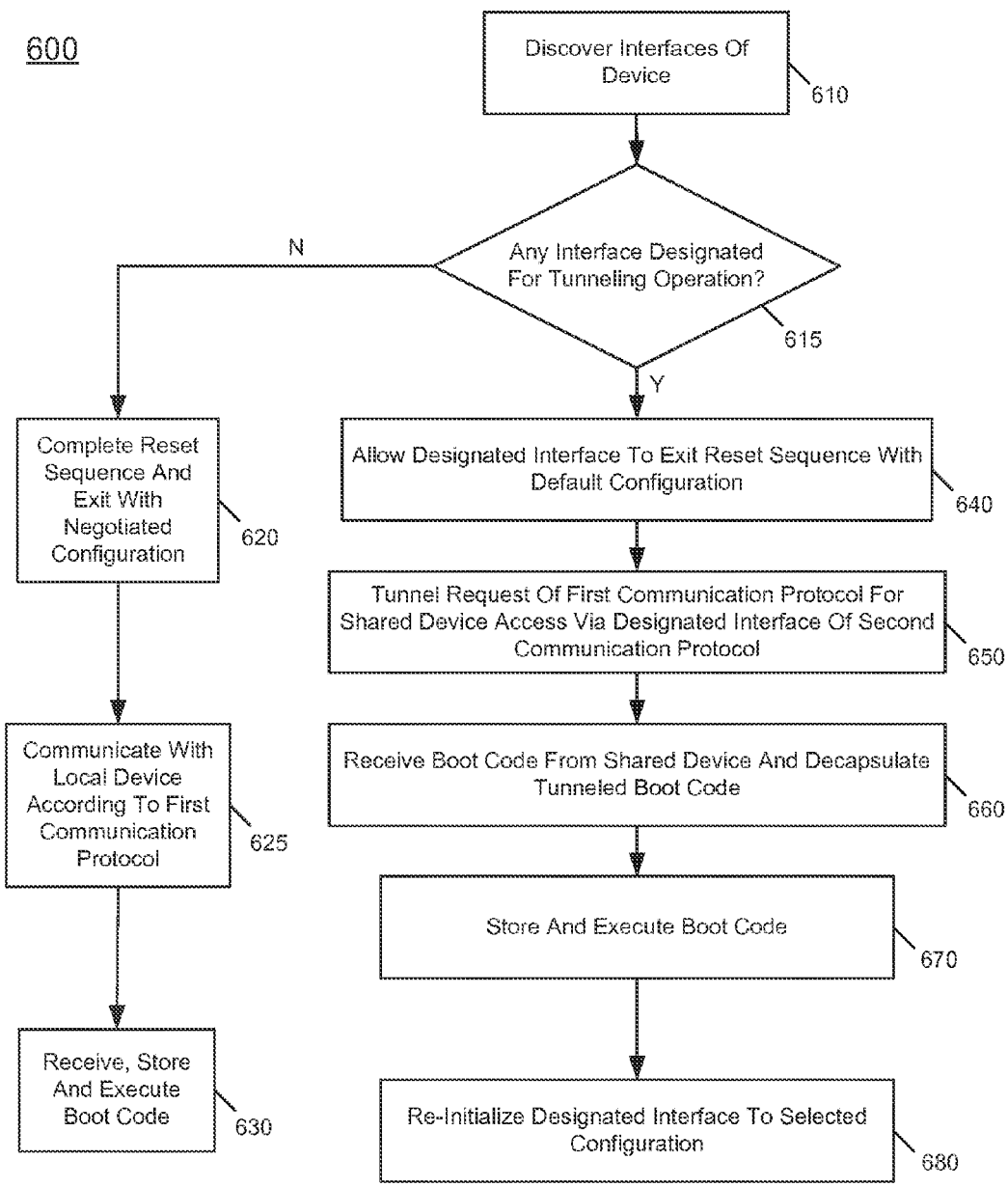
FIG. 6 is a flow diagram of a method in accordance with an embodiment of the present invention.

Referring now to FIG. 6, shown is a flow diagram of a method in accordance with an embodiment of the present invention. As shown in FIG. 6, method 600 may be performed by various logic of a multi-node system during initial boot and configuration operations, as an example. More specifically, method 600 may be performed by logic of a SoC during reset operations of a reset sequence as the SoC is powered up on a system reset to discover its internal circuitry and external interconnections. As seen, method 600 begins by discovering interfaces of the device, which may be a SoC (block 610). Next it is determined whether any interface is designated for tunneling operation (diamond 615), which may be indicted via internal fuse settings or through external straps. If this is not the case, control passes to block 620 where the reset sequence may be completed and the device exits reset with a negotiated configuration. For example, various interfaces of the device may be configured with their given runtime configuration widths, link speeds and so forth. Next at block 625 communications with a local device may occur according to a first communication protocol. For example, in this instance the device may communicate with a local flash memory to obtain boot code. Thus at block 630 this boot code is received in the device, stored in a local memory for lower latency access and the boot code is executed.

In accordance with the examples herein, assume that a PCIe interface is designated to tunnel eSPI information in a system in which the given SoC is to communicate with one or more eSPI devices not locally attached to the SoC. In this case at diamond 615 at least one interface is designated for tunnel operation, and thus control next passes to block 640 where the designated interface may be allowed to exit the reset sequence early. More specifically, this early exit is with a default configuration such as a base configuration for the interface to enable communications via a connected interconnect to occur at low link widths and speeds.

Next at block 650 a request of the first communication protocol may be tunneled via this designated interface of the second communication protocol. More specifically, this request may be for access to a shared resource such as an externally connected flash memory to which the SoC is to have shared access. Responsive to this tunneled request, at block 660 boot code may be received from the shared device. The boot code is decapsulated and at block 670 the boot code can be stored and executed. Thereafter at block 680 the designated interface may be re-initialized to a selected configuration, which may thus enable the interface to operate at higher link speeds and/or widths. Understand while shown at this high level in the embodiment of FIG. 6, many variations and alternatives are possible.

Embodiments may be used in a variety of system topologies, including rack systems to share I/O resources amongst a number of nodes, providing a total cost of ownership (TCO) benefit. Using an embodiment, direct routing eSPI signals between remote sharing nodes can be avoided. Further, with a reduced number of eSPI devices, lower package pin impact and lower power consumption is realized. Embodiments may also facilitate PCIe-based topologies and dense form factor arrangements.

Figure 7:
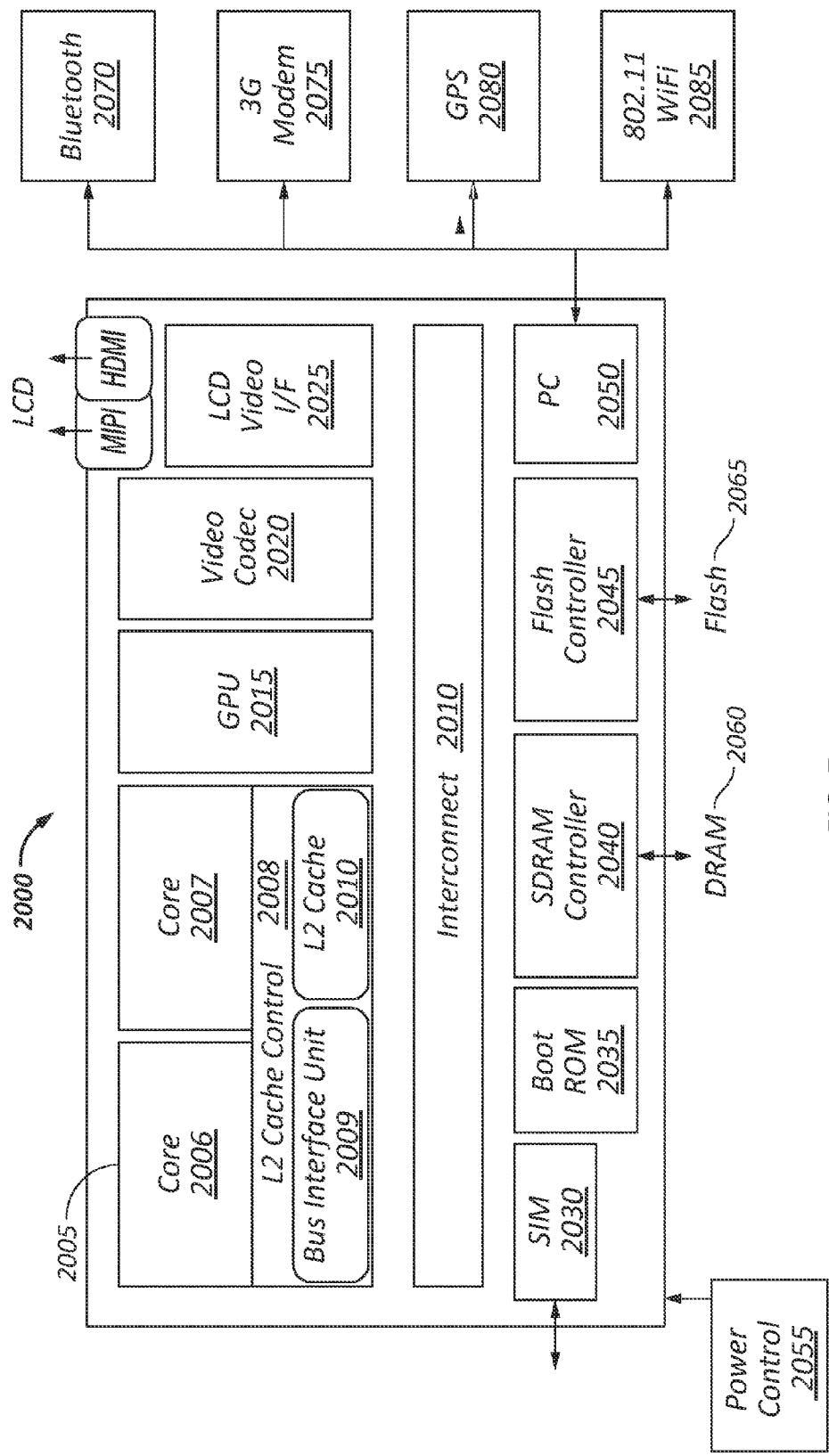
FIG. 7 is an embodiment of a system on-chip design in accordance with an embodiment.

Turning next to FIG. 7, an embodiment of a system on-chip (SOC) design in accordance with an embodiment is depicted. As a specific illustrative example, SOC 2000 may be configured for insertion in any type of computing device, ranging from portable device to server system. Here, SOC 2000 includes 2 cores—2006 and 2007. Similar to the discussion above, cores 2006 and 2007 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 2006 and 2007 are coupled to cache control 2008 that is associated with bus interface unit 2009 and L2 cache 2010 to communicate with other parts of system 2000. Interconnect 2010 includes an on-chip interconnect, and may implement eSPI-PCIe tunneling as described herein.

Interconnect 2010 provides communication channels to the other components, such as a Subscriber Identity Module (SIM) 2030 to interface with a SIM card, a boot ROM 2035 to hold boot code for execution by cores 2006 and 2007 to initialize and boot SOC 2000, a SDRAM controller 2040 to interface with external memory (e.g. DRAM 2060), a flash controller 2045 to interface with non-volatile memory (e.g. Flash 2065), a peripheral controller 2050 (e.g. an eSPI interface) to interface with peripherals, video codecs 2020 and Video interface 2025 to display and receive input (e.g. touch enabled input), GPU 2015 to perform graphics related computations, etc. Any of these interfaces may incorporate aspects described herein.

In addition, the system illustrates peripherals for communication, such as a Bluetooth module 2070, 3G modem 2075, GPS 2080, and WiFi 2085. Also included in the system is a power controller 2055.

Figure 8:
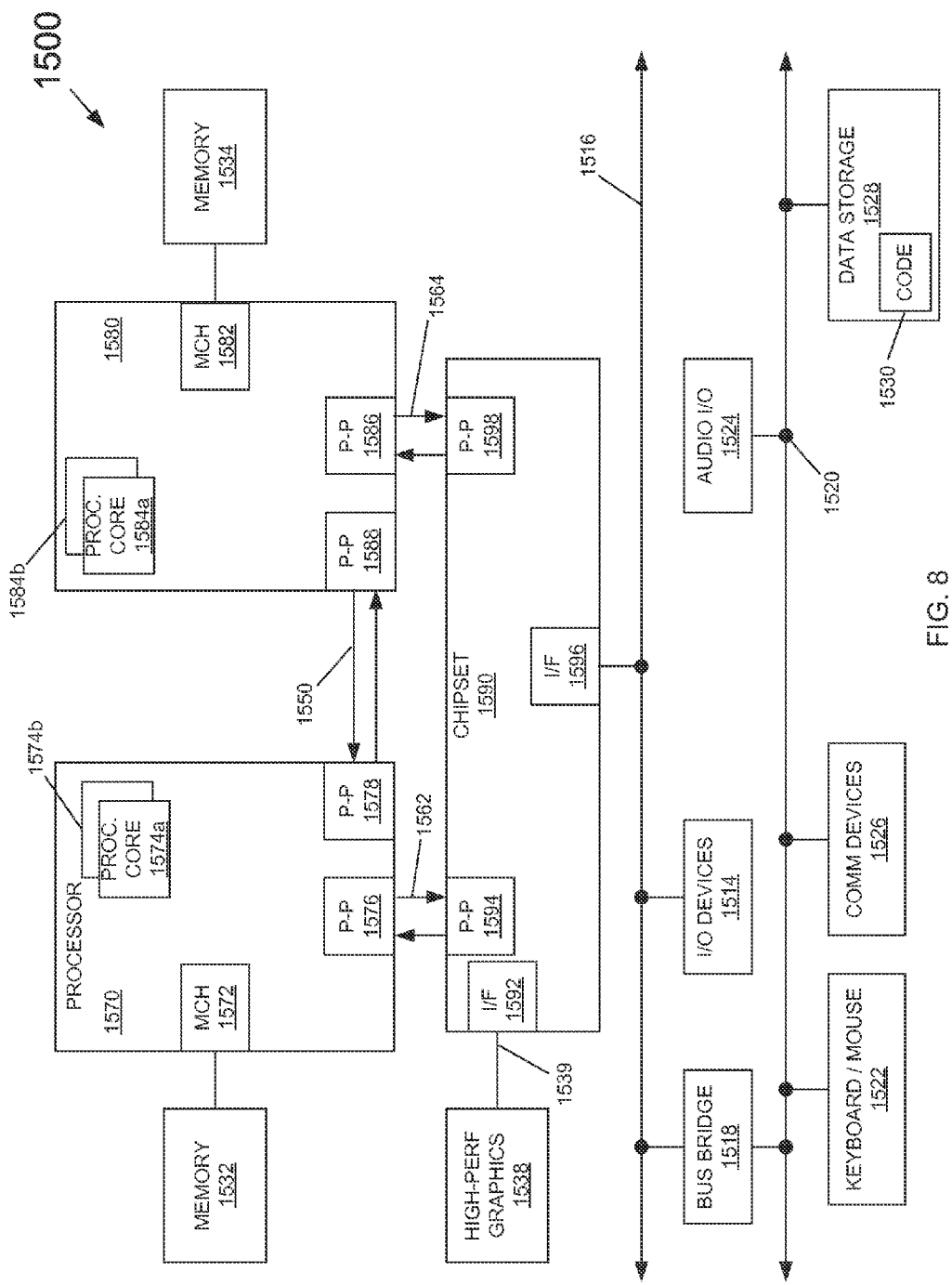
FIG. 8 is a block diagram of a system in accordance with an embodiment of the present invention.

Referring now to FIG. 8, shown is a block diagram of a system in accordance with an embodiment of the present invention. As shown in FIG. 8, multiprocessor system 1500 includes a first processor 1570 and a second processor 1580 coupled via a point-to-point interconnect 1550. As shown in FIG. 8, each of processors 1570 and 1580 may be many core processors including representative first and second processor cores (i.e., processor cores 1574a and 1574b and processor cores 1584a and 1584b). Each processor 1570 and 1580 further may include eSPI interface circuitry as described herein, to reduce component counts in a system.

Still referring to FIG. 8, first processor 1570 further includes a memory controller hub (MCH) 1572 and point-to-point (P-P) interfaces 1576 and 1578. Similarly, second processor 1580 includes a MCH 1582 and P-P interfaces 1586 and 1588. As shown in FIG. 8, MCH's 1572 and 1582 couple the processors to respective memories, namely a memory 1532 and a memory 1534, which may be portions of system memory (e.g., DRAM) locally attached to the respective processors. First processor 1570 and second processor 1580 may be coupled to a chipset 1590 via P-P interconnects 1562 and 1564, respectively. As shown in FIG. 8, chipset 1590 includes P-P interfaces 1594 and 1598.

Furthermore, chipset 1590 includes an interface 1592 to couple chipset 1590 with a high performance graphics engine 1538, by a P-P interconnect 1539. In turn, chipset 1590 may be coupled to a first bus 1516 via an interface 1596. As shown in FIG. 8, various input/output (I/O) devices 1514 may be coupled to first bus 1516, along with a bus bridge 1518 which couples first bus 1516 to a second bus 1520. Various devices may be coupled to second bus 1520 including, for example, a keyboard/mouse 1522, communication devices 1526 and a data storage unit 1528 such as a disk drive or other mass storage device which may include code 1530, in one embodiment. Further, an audio I/O 1524 may be coupled to second bus 1520.

In one example, a SoC comprises: at least one core to independently execute instructions; a first host device to receive information from the at least one core and to include the information in one or more first packets of a first communication protocol; a selection logic coupled to the first host device to receive the one or more first packets and to provide the one or more first packets to a conversion logic or a first interface to communicate with a first device via a first interconnect of the first communication protocol; the conversion logic to receive the one or more first packets under selection of the selection logic and to encapsulate the one or more first packets into one or more second packets of a second communication protocol; and a second interface coupled to the conversion logic to receive the one or more second packets and to communicate the one or more second packets to a second device via a second interconnect of the second communication protocol.

In an example, the first communication protocol comprises an eSPI protocol and the second communication protocol comprises a PCIe protocol.

In an example, the second device comprises a second SoC or a central component to couple between the SoC and a shared resource, the shared resource to communicate according to the first communication protocol.

In an example, the shared resource comprises a non-volatile storage to store a BIOS, where the SoC is to receive boot code of the BIOS from the non-volatile storage via the second interconnect during initialization.

In an example, the second interconnect is to operate at a default configuration prior to execution of the boot code.

In an example, the first interface is to be disabled when the first interface is not coupled to an external device.

In an example, the SoC is to be incorporated into a multi-node system including a plurality of SoCs, where a first SoC of the plurality of SoCs includes a first interface to communicate according to the first communication protocol, the first SoC to directly couple to a first shared resource via an interconnect of the first communication protocol, and others of the plurality of SoCs include a first interface to communicate according to the first communication protocol that is unconnected.

In an example, the first host device is coupled to a first bus and is enumerated with a first device identifier.

In an example, the second interface is coupled to the first bus and is enumerated with a second device identifier.

In an example, the selection logic is to receive one or more third packets of the first communication protocol from the conversion logic and to send the one or more third packets to the first host device.

In an example, the conversion logic is to receive one or more fourth packets of the second communication protocol from the second interface and to decapsulate the one or more third packets of the first communication protocol from the one or more fourth packets of the second communication protocol.

In an example, the conversion logic is to include a tunnel indicator in a header of the one or more second packets of the second communication protocol to indicate presence of the encapsulated one or more first packets of the first communication protocol.

Note that the above SoC can be implemented using various means.

In an example, the SoC may be incorporated in a user equipment touch-enabled device.

In another example, a system comprises a display and a memory, and includes the processor of one or more of the above examples.

In another example, a method comprises: receiving a first packet in a selection logic of the integrated circuit from a host device of the integrated circuit, the host device to communicate in compliance with a first communication protocol, and selectively providing the first packet to a first interface of the integrated circuit when the integrated circuit is adapted within a system having a first device coupled to the first interface via a first interconnect compliant with the first communication protocol, otherwise selectively providing the first communication packet to a first logic of the integrated circuit; when the first packet is provided to the first logic, encapsulating, in the first logic, the first packet into a second packet compliant with a second communication protocol; and communicating the second packet to a second interface of the integrated circuit, the second interface to communicate the second packet to a second device compliant with the first communication protocol, via a second interconnect coupled to the integrated circuit, the second interconnect compliant with the second communication protocol.

In an example, the method further comprises disabling the first interface when the integrated circuit is implemented in a system not having the first device coupled to the first interface.

In an example, encapsulating the first packet into the second packet comprises: setting a tunnel indicator of a header of the second packet; incorporating a cycle type of a header of the first packet into a cycle type field of the header of the second packet; and placing data of the first packet into a data portion of the second packet.

In an example, the method further comprises: initializing the second interconnect to be in a default configuration after a reset; receiving boot code from the second device via the second interconnect; and re-initializing the second interconnect to a second configuration responsive to execution of the boot code.

In another example, a computer readable medium including instructions is to perform the method of any of the above examples.

In another example, a computer readable medium including data is to be used by at least one machine to fabricate at least one integrated circuit to perform the method of any one of the above examples.

In another example, an apparatus comprises means for performing the method of any one of the above examples.

In a still further example, a system comprises: a plurality of nodes each including a processor, the plurality of nodes to communicate with each other via a second communication protocol; and a device to be shared by at least some of the plurality of nodes, where the device is to communicate according to a first communication protocol, and a first node of the plurality of nodes is adapted to route first packets of the first communication protocol received from the device when the device is locally coupled to the first node to a second node of the plurality of nodes via second packets of the second communication protocol, and when the device is not locally coupled to the first node, the first node is to receive third packets of the second communication protocol and decapsulate from the third packets of the second communication protocol second packets of the first communication protocol directed to the first node from the device.

In an example, the system further comprises a fabric to couple the plurality of nodes via a first set of interconnects of the second communication protocol, where the first node and the second node are coupled to the fabric.

In an example, the system further comprises a central controller coupled to the first node and the second node, where the device is locally coupled to the central controller.

In an example, the central controller is adapted to provide shared access to the device by the plurality of nodes, the central controller including a conversion logic to receive communications from the plurality of nodes according to the second communication protocol, convert the communications to decapsulated communications of the first communication protocol and to provide the decapsulated communications to the device.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A system on chip (SoC) comprising:
at least one core to independently execute instructions;
a first host device to receive information from the at least one core and to include the information in one or more first packets of a first communication protocol, wherein the first host device is coupled to a first bus and is enumerated with a first device identifier;
a selection logic coupled to the first host device to receive the one or more first packets and to provide the one or more first packets to a conversion logic or a first interface to communicate with a first device via a first interconnect of the first communication protocol;
the conversion logic to receive the one or more first packets under selection of the selection logic and to encapsulate the one or more first packets into one or more second packets of a second communication protocol; and
a second interface coupled to the conversion logic to receive the one or more second packets and to communicate the one or more second packets to a second device via a second interconnect of the second communication protocol.

2. The SoC of claim 1, wherein the first communication protocol comprises an enhanced serial peripheral interface protocol and the second communication protocol comprises a peripheral component interconnect express protocol.

3. The SoC of claim 1, wherein the second device comprises a second SoC or a central component to couple between the SoC and a shared resource, the shared resource to communicate according to the first communication protocol.

4. The SoC of claim 3, wherein the shared resource comprises a non-volatile storage to store a basic input/output system (BIOS), wherein the SoC is to receive boot code of the BIOS from the non-volatile storage via the second interconnect during initialization.

5. The SoC of claim 3, wherein the second interconnect is to operate at a default configuration prior to execution of the boot code.

6. The SoC of claim 1, wherein the first interface is to be disabled when the first interface is not coupled to an external device.

7. The SoC of claim 1, wherein the SoC is to be incorporated into a multi-node system including a plurality of SoCs, wherein a first SoC of the plurality of SoCs includes a first interface to communicate according to the first communication protocol, the first SoC to directly couple to a first shared resource via an interconnect of the first communication protocol, and others of the plurality of SoCs include a first interface to communicate according to the first communication protocol that is unconnected.

8. The SoC of claim 1, wherein the second interface is coupled to the first bus and is enumerated with a second device identifier.

9. The SoC of claim 1, wherein the selection logic is to receive one or more third packets of the first communication protocol from the conversion logic and to send the one or more third packets to the first host device.

10. The SoC of claim 9, wherein the conversion logic is to receive one or more fourth packets of the second communication protocol from the second interface and to decapsulate the one or more third packets of the first communication protocol from the one or more fourth packets of the second communication protocol.

11. The SoC of claim 1, wherein the conversion logic is to include a tunnel indicator in a header of the one or more second packets of the second communication protocol to indicate presence of the encapsulated one or more first packets of the first communication protocol.

12. A non-transitory machine-readable medium having stored thereon data, which if used by at least one machine, causes the at least one machine to fabricate an integrated circuit to perform a method comprising:
receiving a first packet in a selection logic included in the integrated circuit from a host device included in the integrated circuit, the host device to communicate in compliance with a first communication protocol, and selectively providing the first packet to a first interface included in the integrated circuit when the integrated circuit is adapted within a system having a first device coupled to the first interface via a first interconnect compliant with the first communication protocol, otherwise selectively providing the first communication packet to a first logic included in the integrated circuit;
when the first packet is provided to the first logic, encapsulating, in the first logic, the first packet into a second packet compliant with a second communication protocol; and
communicating the second packet to a second interface included in the integrated circuit, the second interface to communicate the second packet to a second device compliant with the first communication protocol, via a second interconnect coupled to the integrated circuit, the second interconnect compliant with the second communication protocol.

13. The non-transitory machine readable medium of claim 12, wherein the method further comprises disabling the first interface when the integrated circuit is implemented in a system not having the first device coupled to the first interface.

14. The non-transitory machine readable medium of claim 12, wherein encapsulating the first packet into the second packet comprises:
setting a tunnel indicator of a header of the second packet;
incorporating a cycle type of a header of the first packet into a cycle type field of the header of the second packet; and
placing data of the first packet into a data portion of the second packet.

15. The non-transitory machine readable medium of claim 12, wherein the method further comprises:
initializing the second interconnect to be in a default configuration after a reset;
receiving boot code from the second device via the second interconnect; and
re-initializing the second interconnect to a second configuration responsive to execution of the boot code.

16. A system comprising:
a plurality of nodes each including a processor, the plurality of nodes to communicate with each other via a second communication protocol; and
a device to be shared by at least some of the plurality of nodes, wherein the device is to communicate according to a first communication protocol, and a first node of the plurality of nodes is adapted to route first packets of the first communication protocol received from the device when the device is locally coupled to the first node to a second node of the plurality of nodes via second packets of the second communication protocol, and when the device is not locally coupled to the first node, the first node is to receive third packets of the second communication protocol and decapsulate from the third packets of the second communication protocol second packets of the first communication protocol directed to the first node from the device.

17. The system of claim 16, further comprising a fabric to couple the plurality of nodes via a first set of interconnects of the second communication protocol, wherein the first node and the second node are coupled to the fabric.

18. The system of claim 16, further comprising a central controller coupled to the first node and the second node, wherein the device is locally coupled to the central controller.

19. The system of claim 18, wherein the central controller is adapted to provide shared access to the device by the plurality of nodes, the central controller including a conversion logic to receive communications from the plurality of nodes according to the second communication protocol, convert the communications to decapsulated communications of the first communication protocol and to provide the decapsulated communications to the device.

* * * * *